(12) United States Patent
Kats et al.

(10) Patent No.: US 11,469,904 B1
(45) Date of Patent: Oct. 11, 2022

(54) SYSTEMS AND METHODS FOR AUTHENTICATING DIGITAL MEDIA CONTENT

(71) Applicant: Symantec Corporation, Mountain View, CA (US)

(72) Inventors: Daniel Kats, Culver City, CA (US); Christopher Gates, Culver City, CA (US); Acar Tamersoy, Culver City, CA (US); Daniel Marino, Los Angeles, CA (US)

(73) Assignee: NortonLifeLock Inc., Tempe, AZ (US)

( * ) Notice: Subject to any disclaimer, the term of this patent is extended or adjusted under 35 U.S.C. 154(b) by 547 days.

(21) Appl. No.: 16/360,515

(22) Filed: Mar. 21, 2019

(51) Int. Cl.
*H04L 9/32* (2006.01)
*G06F 21/10* (2013.01)
*G06F 21/60* (2013.01)
*H04L 9/00* (2022.01)

(52) U.S. Cl.
CPC ............ *H04L 9/3247* (2013.01); *G06F 21/10* (2013.01); *G06F 21/602* (2013.01); *H04L 9/3297* (2013.01); *G06F 2221/0724* (2013.01); *H04L 9/50* (2022.05); *H04L 2209/34* (2013.01); *H04L 2209/60* (2013.01)

(58) Field of Classification Search
CPC . H04L 9/3247; H04L 9/3297; H04L 2209/60; H04L 2209/34; H04L 2209/38; H04L 9/50; G06F 21/10; G06F 21/602; G06F 2221/0724
See application file for complete search history.

(56) References Cited

U.S. PATENT DOCUMENTS

| | | | | |
|---|---|---|---|---|
| 5,499,294 A | * | 3/1996 | Friedman | G07D 7/004 380/246 |
| 9,025,851 B2 | * | 5/2015 | Smith | H04N 1/4177 382/137 |
| 9,660,972 B1 | * | 5/2017 | Roth | H04L 63/083 |
| 9,916,476 B2 | * | 3/2018 | Dasari | G06F 21/72 |
| 10,360,668 B1 | * | 7/2019 | McGregor | H04L 9/0637 |

(Continued)

OTHER PUBLICATIONS

Haya R. Hasan and Khaled Salah, Combating Deepfake Videos Using Blockchain and Smart Contracts, Feb. 2019, IEEE.*

(Continued)

*Primary Examiner* — David Garcia Cervetti
(74) *Attorney, Agent, or Firm* — FisherBroyles, LLP

(57) ABSTRACT

The disclosed computer-implemented method for authenticating digital media content may include (i) receiving digital media content that has been captured by a capturing device and digitally signed through a cryptoprocessor embedded within the capturing device to provide an assurance of authenticity regarding how the capturing device captured the digital media content, and (ii) encoding an identifier of the received digital media content and a digital signature to an encrypted distributed ledger, the digital signature including at least one of a digital signature of the digital media content by the capturing device or a digital signature of the digital media content by an entity encoding the received digital media content such that the encoding becomes available for subsequent verification through the encrypted distributed ledger. Various other methods, systems, and computer-readable media are also disclosed.

20 Claims, 6 Drawing Sheets

(56) References Cited

U.S. PATENT DOCUMENTS

| | | | | |
|---|---|---|---|---|
| 10,361,866 | B1* | 7/2019 | McGregor | H04L 9/0637 |
| 10,476,863 | B1* | 11/2019 | Hanlon | H04L 63/108 |
| 10,547,457 | B1* | 1/2020 | Duccini | H04L 63/06 |
| 10,742,420 | B1* | 8/2020 | Griffin | H04L 9/3093 |
| 10,778,426 | B1* | 9/2020 | Wolfson | H04L 9/3297 |
| 10,949,926 | B1* | 3/2021 | Call | G06Q 40/08 |
| 11,101,995 | B1* | 8/2021 | Oliver | G06F 16/7837 |
| 11,128,473 | B1* | 9/2021 | Kats | G06F 21/602 |
| 2002/0093573 | A1* | 7/2002 | Cromer | H04N 5/772 386/E5.072 |
| 2003/0123701 | A1* | 7/2003 | Dorrell | H04N 1/32283 382/232 |
| 2004/0080615 | A1* | 4/2004 | Klein | G08B 13/19658 348/143 |
| 2006/0036864 | A1* | 2/2006 | Parulski | H04L 9/3247 713/176 |
| 2010/0088522 | A1* | 4/2010 | Barrus | G06F 21/64 713/181 |
| 2014/0310509 | A1* | 10/2014 | Potlapally | G06F 11/1417 713/2 |
| 2014/0321640 | A1* | 10/2014 | Johne | G06F 21/602 380/28 |
| 2014/0337250 | A1* | 11/2014 | Matsuyama | G06Q 50/01 705/347 |
| 2014/0337251 | A1* | 11/2014 | Matsuyama | G06Q 30/02 705/347 |
| 2015/0207813 | A1* | 7/2015 | Reybok | H04L 63/145 726/22 |
| 2016/0085980 | A1* | 3/2016 | Imaizumi | G06F 21/6209 726/28 |
| 2017/0126907 | A1* | 5/2017 | Tamura | H04N 1/00244 |
| 2017/0142543 | A1* | 5/2017 | Ossin | H04W 4/80 |
| 2017/0206523 | A1* | 7/2017 | Goeringer | G06F 21/45 |
| 2017/0235968 | A1* | 8/2017 | Kishi | G06F 16/58 707/781 |
| 2017/0250972 | A1* | 8/2017 | Ronda | H04L 63/0428 |
| 2017/0316531 | A1* | 11/2017 | Smith | H04N 5/77 |
| 2017/0323542 | A1* | 11/2017 | Koh | G06F 21/445 |
| 2017/0357087 | A1* | 12/2017 | Huang | G06V 10/751 |
| 2018/0121635 | A1* | 5/2018 | Tormasov | H04L 9/3236 |
| 2018/0152297 | A1* | 5/2018 | Fielding | H04L 9/3236 |
| 2018/0159836 | A1* | 6/2018 | Wakai | G06F 9/445 |
| 2018/0205546 | A1* | 7/2018 | Haque | H04L 9/3213 |
| 2018/0253539 | A1* | 9/2018 | Minter | G06F 21/64 |
| 2018/0309581 | A1* | 10/2018 | Butler | H04W 12/069 |
| 2019/0013934 | A1* | 1/2019 | Mercuri | G06N 20/00 |
| 2019/0044732 | A1* | 2/2019 | Reinders | H04L 9/3073 |
| 2019/0123911 | A1* | 4/2019 | Riley | H04L 9/3236 |
| 2019/0205558 | A1* | 7/2019 | Gonzales, Jr. | H04L 9/3239 |
| 2019/0228133 | A1* | 7/2019 | Ansari | G06F 21/10 |
| 2019/0281066 | A1* | 9/2019 | Simons | H04L 9/3239 |
| 2019/0295202 | A1* | 9/2019 | Mankovskii | H04L 9/3218 |
| 2019/0354967 | A1* | 11/2019 | Lee | G06F 16/275 |
| 2019/0391972 | A1* | 12/2019 | Bates | G06F 16/51 |
| 2020/0034888 | A1* | 1/2020 | Soundararajan | H04L 9/0637 |
| 2020/0034945 | A1* | 1/2020 | Soundararajan | G06T 1/0021 |
| 2020/0045020 | A1* | 2/2020 | Soundararajan | H04L 9/0643 |
| 2020/0099885 | A1* | 3/2020 | Matsumoto | H04N 5/76 |
| 2020/0106877 | A1* | 4/2020 | Ledvina | H04M 1/72436 |
| 2020/0117793 | A1* | 4/2020 | Simpson | G06F 21/44 |
| 2020/0136832 | A1* | 4/2020 | Li | G06F 21/645 |
| 2020/0145214 | A1* | 5/2020 | Linton | G06Q 20/223 |
| 2020/0159890 | A1* | 5/2020 | Chui | G06F 21/105 |
| 2020/0159891 | A1* | 5/2020 | Patel | G06F 21/16 |
| 2020/0213329 | A1* | 7/2020 | Simons | G06F 21/6254 |
| 2020/0242903 | A1* | 7/2020 | Lee | H04N 7/18 |
| 2020/0349249 | A1* | 11/2020 | Weston | G06V 40/70 |
| 2021/0133343 | A1* | 5/2021 | Soeda | G06F 21/645 |
| 2021/0144149 | A1* | 5/2021 | Simons | G06N 20/00 |
| 2021/0194699 | A1* | 6/2021 | Tatonetti | H04N 5/77 |
| 2022/0058241 | A1* | 2/2022 | Ekberg | G06F 21/10 |
| 2022/0116356 | A1* | 4/2022 | Baum | H04L 63/104 |

OTHER PUBLICATIONS

Edward T. Grogan, Techniques to Detect Modified Video, Feb. 2018, IEEE.*

Wikipedia, "Trusted Platform Module", URL : https://en.wikipedia.org/wiki/Trusted_Platform_Module, retrieved on Jun. 27, 2019, pp. 1-10.

Kaplan et al., "AMD Memory Encryption", URL: http://amd-dev.wpengine.netdna-cdn.com/wordpress/media/2013/12 'AMD_Memory_Encryption_Whitepaper_v7-Public.pdf, White Paper, Apr. 21, 2016, 12 pages.

"Intel® Software Guard Extensions", URL: https://software.intel.com/en-us/sgx, Intel® Software, Developer Zone, retrieved on Jun. 27, 2019, pp. 1-5.

Arm, "Products Security", URL: https://www.arm.com/products/silicon-ip-security, retrieved on Jun. 27, 2019, pp. 1-11.

Colp et al., "Protecting Data on Smartphones and Tablets from Memory Attacks", URL: http://dx.doi.org/10.1145/2694344.2694380, ASPLOS '15, Mar. 14-18, 2015, pp. 177-189.

Wikipedia, "Trusted timestamping", URL: https://en.wikipedia.org/wiki/Trusted_timestamping, retrieved on Jun. 27, 2019, pp. 1-4.

Swanson et al., "Multimedia Data-Embedding and Watermarking Technologies", Proceedings of the IEEE, vol. 86, No. 6, Jun. 1998, pp. 1064-1087.

Langelaar et al., "Watermarking Digital Image and Video Data—A State-of-the-Art Overview", IEEE Signal processing magazine, vol. 17, No. 5, Sep. 2000, pp. 20-46.

Bhowmik et al., "The Multimedia Blockchain: A Distributed and Tamper-Proof Media Transaction Framework", Digital Signal Processing (DSP), 22nd International Conference, IEEE, Nov. 2017, 5 pages.

"Uproov", URL: http://uproov.com/guides/Uproov%20Mobile%20Verification%20Technology%20Guide%20-%20Consumer.pdf, Ledger Assets, 2015, 11 pages.

Bosch, "Bosch Security Systems—Video Systems", Aug. 2016, pp. 1-9.

"Crypto Processors", URL: https://semiengineering.com/knowledge-center/, Semiconductor Engineering, retrieved on Nov. 3, 2021, 2 pages.

"Definition of cryptoprocessor", URL: https://www.pcmag.com/encyclopedia/term/cryptoprocessor, PCMag, retrieved on Nov. 3, 2021, 1 page.

"Digital signature—definition and meaning", URL: https://www.wordnik.com/words/digital%20signature, retrieved on Nov. 3, 2021, 1 page.

"Digital signature—Glossary", URL: https://csrc.nist.gov/glossary/term/digital_signature, CSRC, retrieved on Nov. 3, 2021, 4 pages.

Wikipedia, "Digital signature", URL: https://en.wikipedia.org/wiki/Digital_signature, retrieved on Nov. 3, 2021, 12 pages.

study.com, "Do you think cryptoprocessors would be worthwhile for you to protect your privacy? Why or why not?", URL: https://study.com/academy/answer/do-you-think-cryptoprocessors-would, retrieved on Nov. 3, 2021, 1 page.

"Encode | Definition of Encode by Merriam-Webster", URL: https://www.merriam-webster.com/dictionary/encode, Merriam-Webster, retrieved on Nov. 3, 2021, 2 pages.

"Understanding Digital Signatures", URL: https://us-cert.cisa.gov/ncas/tips/ST04-018, CISA, Security Tip (ST04-018), Dec. 17, 2009, pp. 1-3.

Adobe, "What's a digital signature", URL: https://www.adobe.com/sign/digital-signatures.html, retrieved on Nov. 3, 2021, pp. 1-9.

* cited by examiner

SYSTEMS AND METHODS FOR AUTHENTICATING DIGITAL MEDIA CONTENT

BACKGROUND

In the modern media age the problems of "fake news" and media hoax stories are on the rise. Photos and videos are often doctored to suit a deceptive agenda. On the other hand, legitimate photos and videos are often claimed to be doctored, when the truth instead is that these photos and videos show authentic and non-doctored content that is just inconvenient or embarrassing. Conventional techniques for addressing and resolving these disputes may be limited to establishing some degree of trust in the organizations publicizing this media and/or through rigorous vetting processes. The present disclosure, therefore, identifies and addresses a need for improved systems and methods for authenticating digital media content.

SUMMARY

As will be described in greater detail below, the present disclosure describes various systems and methods for authenticating digital media content. In one example, a computer-implemented method for authenticating digital media content may include (i) receiving digital media content that has been captured by a capturing device and digitally signed through a cryptoprocessor embedded within the capturing device to provide an assurance of authenticity regarding how the capturing device captured the digital media content and (ii) encoding an identifier of the received digital media content and a digital signature to an encrypted distributed ledger, the digital signature including at least one of a digital signature of the digital media content by the capturing device or a digital signature of the digital media content by an entity encoding the received digital media content such that the encoding becomes available for subsequent verification through the encrypted distributed ledger.

In one embodiment, the digital media content may include (i) audio content recorded by a microphone, (ii) visual content recorded by a camera sensor, and/or (iii) video content recorded by a video camera sensor. In one embodiment, the digital signature further may include (i) a digital signature of geolocation information indicating a location where the capturing device captured the digital media content, (ii) a digital signature of a focal length of a camera that captured the digital media content, and/or (iii) a digital signature of an item of EXIF metadata matching the digital media content.

In one embodiment, the assurance of authenticity may include (i) an assurance that the digital media content originated from the capturing device, (ii) an assurance of a recorded time of recording the digital media content, and/or (iii) an assurance that the entity encoding the received digital media content operated the capturing device to record the digital media content. In one embodiment, the assurance of authenticity may include an assurance that the digital media content originated from a sensor of the capturing device prior to the digital media content being accessible to any computing component of the capturing device with a capability to manipulate the digital media content.

In some examples, encoding the received digital media content enables a user with access to the encrypted distributed ledger to verify that the digital media content was encoded within the encrypted distributed ledger without further exposing the digital media content to being extracted from the encrypted distributed ledger. In one embodiment, the entity encoding the received digital media content into the encrypted distributed ledger may include a news organization and/or a law enforcement organization.

In some examples, encoding the received digital media content into the encrypted distributed ledger further encodes an indication of a time of the encoding such that a user with access to the encrypted distributed ledger can subsequently verify the time of the encoding. In some examples, encoding the indication of the time of the encoding further enables the user to subsequently verify that the time of the encoding occurred after a time of the capturing device capturing the received digital media content as indicated by a digital signature through the cryptoprocessor of the time of the capturing device capturing the received digital media content. In some examples, the computer-implemented method may further include encoding the received digital media content to the encrypted distributed ledger together with both the digital signature of the digital media content by the capturing device and also the digital signature of the digital media content by the entity encoding the received digital media content.

In one embodiment, a system for implementing the above-described method may include (i) a reception module, stored in memory, that receives digital media content that has been captured by a capturing device and digitally signed through a cryptoprocessor embedded within the capturing device to provide an assurance of authenticity regarding how the capturing device captured the digital media content, (ii) an encoding module, stored in memory, that encodes an identifier of the received digital media content and a digital signature to an encrypted distributed ledger, the digital signature including at least one of a digital signature of the digital media content by the capturing device or a digital signature of the digital media content by an entity encoding the received digital media content such that the encoding becomes available for subsequent verification through the encrypted distributed ledger, and (iii) at least one physical processor configured to execute the reception module and the encoding module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive digital media content that has been captured by a capturing device and digitally signed through a cryptoprocessor embedded within the capturing device to provide an assurance of authenticity regarding how the capturing device captured the digital media content and (ii) encode an identifier of the received digital media content and a digital signature to an encrypted distributed ledger, the digital signature including at least one of a digital signature of the digital media content by the capturing device or a digital signature of the digital media content by an entity encoding the received digital media content such that the encoding becomes available for subsequent verification through the encrypted distributed ledger.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
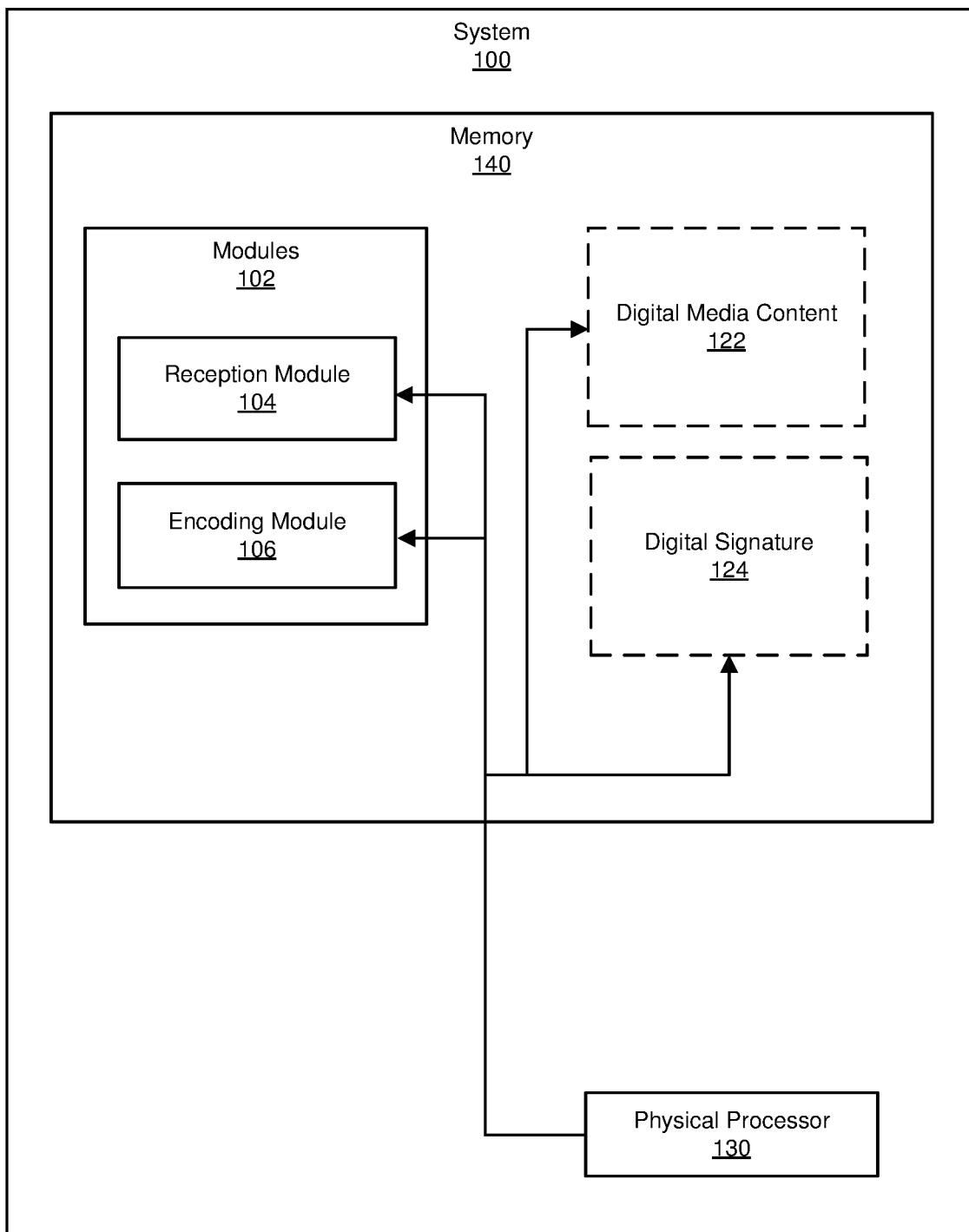
FIG. 1 is a block diagram of an example system for authenticating digital media content.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for authenticating digital media content. The disclosed subject matter may improve upon related systems by improving the ability of individuals and organizations, such as news organizations and law enforcement organizations, to provide assurances to others of integrity and authenticity of one or more items of multimedia content. The disclosed subject matter may leverage both cryptoprocessors embedded within capturing devices such as microphones and cameras as well as encrypted distributed ledgers, in a novel and inventive manner, to thereby achieve these improvements in the ability to provide assurances of integrity and authenticity.

Figure 2:
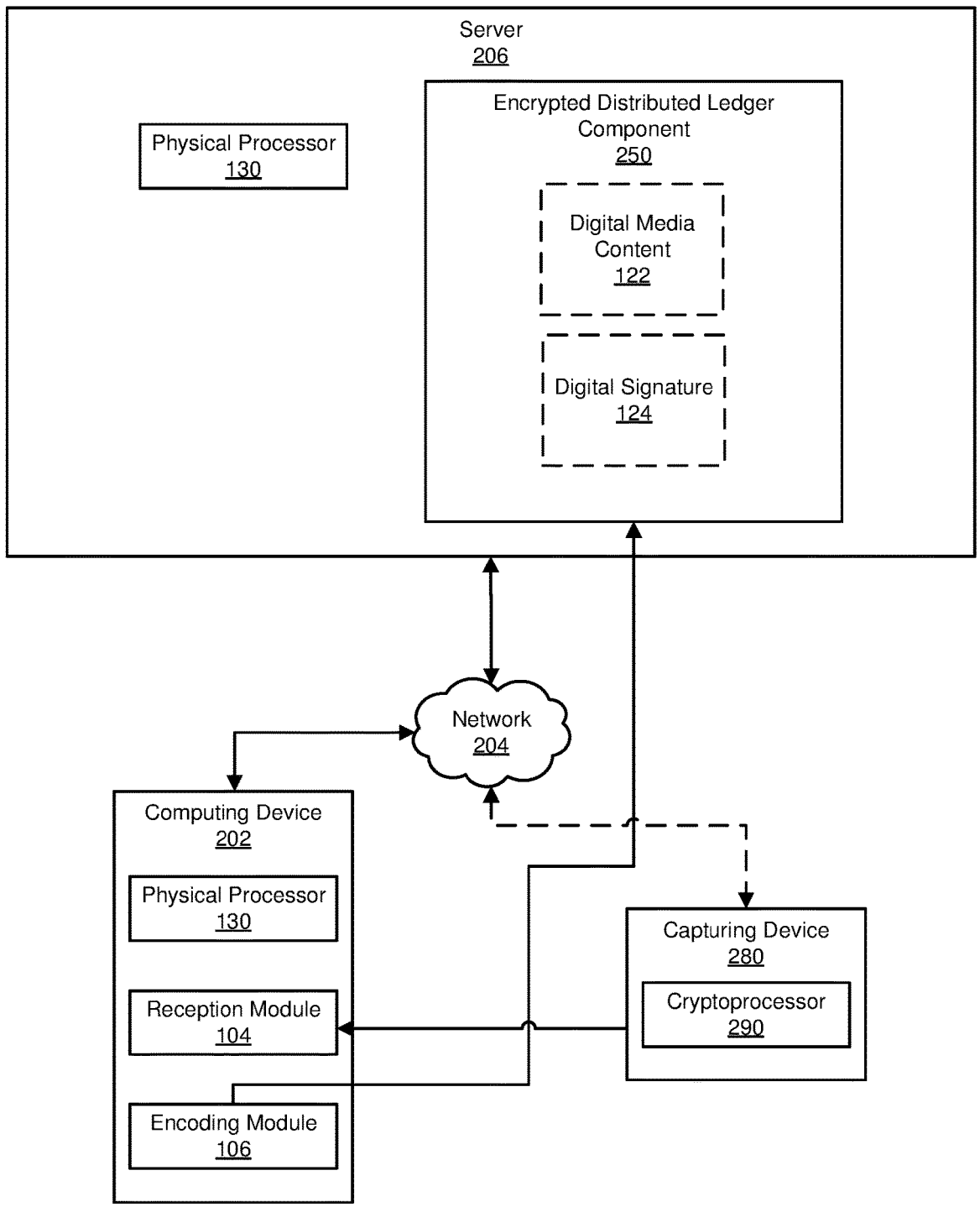
FIG. 2 is a block diagram of an additional example system for authenticating digital media content.

The following will provide, with reference to FIGS. 1-2, detailed descriptions of example systems for authenticating digital media content. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for authenticating digital media content. As illustrated in this figure, example system 100 may include one or more modules 102 for performing one or more tasks. For example, and as will be explained in greater detail below, example system 100 may include a reception module 104 that receives digital media content 122 that has been captured by capturing device and digitally signed through a cryptoprocessor embedded within the capturing device to provide an assurance of authenticity regarding how the capturing device captured the digital media content. Example system 100 may additionally include an encoding module 106 that encodes an identifier of the received digital media content 122 and a digital signature 124 to an encrypted distributed ledger, including at least one of a digital signature of the digital media content by the capturing device or a digital signature of the digital media content by an entity encoding the received digital media content such that the encoding becomes available for subsequent verification through the encrypted distributed ledger. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate authenticating digital media content. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to authenticate digital media content.

For example, and as will be described in greater detail below, reception module 104 may receive digital media content 122 that has been captured by a capturing device 280 and digitally signed through a cryptoprocessor 290 embedded within the capturing device 280 to provide an assurance of authenticity regarding how capturing device 280 captured digital media content 122. Encoding module 106 may encode an identifier of received digital media content 122 and a digital signature 124 to an encrypted distributed ledger, such as by interfacing with a node or component of the encrypted distributed ledger such as an encrypted distributed ledger component 250, the digital signature 124 including at least one of a digital signature of digital media content 122 by capturing device 280 or a digital signature of digital media content 122 by an entity encoding received digital media content 122 such that the encoding becomes available for subsequent verification through the encrypted distributed ledger.

Computing device 202 generally represents any type or form of computing device capable of reading computer-executable instructions. Illustrative examples of computing device 202 may correspond to any computing device that a user or other entity may use to upload or otherwise encode information to the encrypted distributed ledger in accordance with method 300. In some examples, computing device 202 and capturing device 280 may be effectively combined, such that the computing device 202 may be bypassed and/or omitted, as further indicated by the dashed line between network 204 and capturing device 280 in FIG. 2. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300. In some illustrative examples, server 206 may correspond to any server, node, peer, and/or component of an overall distributed ledger system, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
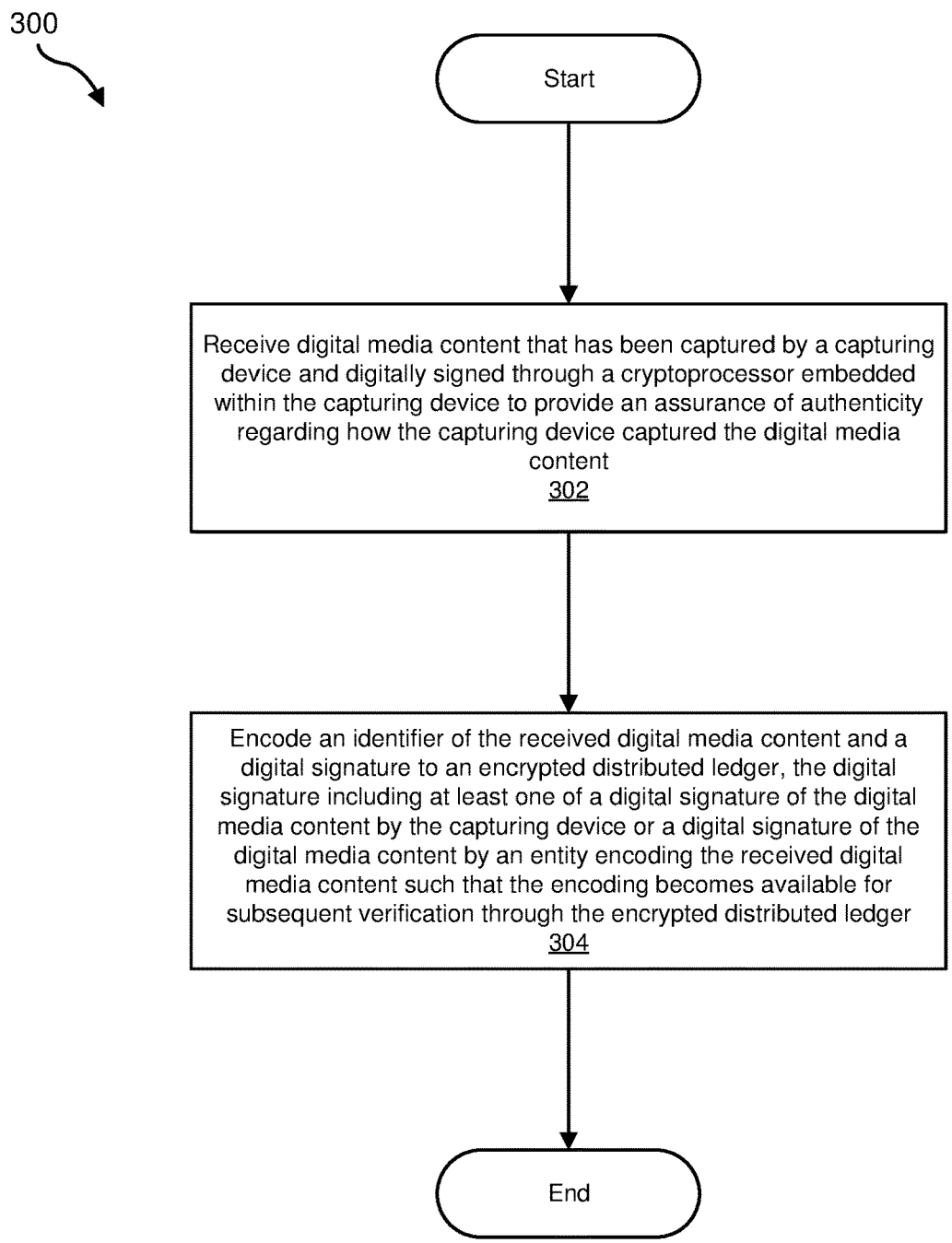
FIG. 3 is a flow diagram of an example method for authenticating digital media content.

FIG. 3 is a flow diagram of an example computer-implemented method 300 for authenticating digital media content. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive digital media content that has been digitally signed through a cryptoprocessor embedded within a capturing device that captured the digital media content to provide an assurance of authenticity regarding how the capturing device captured the digital media content. For example, reception module 104 may, as part of computing device 202 in FIG. 2, receive digital media content 122 that has been captured by capturing device 280 and digitally signed through cryptoprocessor 290 embedded within capturing device 280 to provide an assurance of authenticity regarding how capturing device 280 captured digital media content 122.

Reception module 104 may receive the digital media content in a variety of ways. In some examples, reception module 104 may receive the digital media content through a connection, such as a wired or wireless connection, with capturing device 280, as further illustrated in FIG. 2. Alternatively, in some examples, reception module 104 may receive the digital media content in scenarios where reception module 104 resides within capturing device 280 itself. In other words, reception module 104 may, in these examples, receive the digital media content in connection with a sensor of capturing device 280 receiving the digital media content through the corresponding sensor. Furthermore, in some examples, digital media content may be transferred between capturing device 280 and computing device 202 by way of a portable storage device, such as a USB thumb stick.

In one embodiment, the digital media content may include at least one of: (i) audio content recorded by a microphone, (ii) visual content captured by a camera sensor, and/or (iii) video content recorded by a video camera sensor. Additionally, or alternatively, in other examples the digital media content may correspond to any other suitable content detectable through one or more of the five human senses. For example, other illustrative examples of the digital media content may include haptic interface content and/or virtual reality content.

Returning to FIG. 3, at step 304, one or more of the systems described herein may encode an identifier of the received digital media content and a digital signature to an encrypted distributed ledger, the digital signature including at least one of a digital signature of the digital media content by the capturing device or a digital signature of the digital media content by an entity encoding the received digital media content such that the encoding becomes available for subsequent verification through the encrypted distributed ledger. For example, encoding module 106 may, as part of computing device 202 in FIG. 2, encode an identifier of received digital media content 122 and a digital signature to an encrypted distributed ledger, which may correspond to encrypted distributed ledger component 250, and digital signature 124 may include at least one of a digital signature of digital media content 122 by capturing device 280 or a digital signature of digital media content 122 by an entity encoding received digital media content 122 such that the encoding becomes available for subsequent verification through the encrypted distributed ledger. In some examples, the identifier of the digital media content may include a hash or fingerprint of the digital media content. Additionally, or alternatively, the identifier of the digital media content may include a copy of the digital media content itself.

Encoding module 106 may encode the identifier of the received digital media content in a variety of ways. In various examples, encoding module 106 may reside within computing device 202 as further illustrated in the embodiment of FIG. 2. In these examples, encoding module 106 may encode information within the encrypted distributed ledger at least in part by transmitting corresponding instructions to encrypted distributed ledger component 250 (i.e., perform the encoding process locally or remotely in cooperation with a server, node, or peer that forms part of the encrypted distributed ledger). Alternatively, in other optional embodiments, encoding module 106 may reside within server 206 and thereby encode information directly within encrypted distributed ledger component 250.

By way of background, the distributed encrypted ledger may include any suitable distributed ledger, shared ledger, or distributed ledger technology ("DLT"). Such ledgers may provide a consensus of replicated, shared, and synchronized digital data, which may further be spread across a variety of different and geographically remote locations, thereby providing a high level of data redundancy. Because all the various nodes or peers of the distributed encrypted ledger may agree, using one or more consensus algorithms, on the actual integrity or content of data encoded within the ledger, it may become effectively impossible or impractical to remove the information or otherwise deny that it was encoded in the state in which it was actually encoded (e.g., so long as the instance of the ledger persists, any information successfully encoded within the ledger cannot be effectively reversed). In some examples, such ledgers may provide a distributed consensus of the actual bit-by-bit content of data encoded within these ledgers, as well as the timing of these encodings, as well as any one or more additional items of metadata information describing how the underlying content was encoded. In general, such ledgers may operate through a peer-to-peer computing network, which may overlay as part of a larger wide area network, such as the Internet or network 204 shown in FIG. 2. One illustrative example of these ledgers may include the popular blockchain system.

In some examples, these ledgers may be private in the sense that one or more techniques, such as user account authentication and invitation schemes, effectively restrict access to these ledgers to a limited or predefined subset of individuals and/or entities. Alternatively, in some examples these ledgers may be public or semipublic, in the sense that any member of the general public, or any person with access to a wide area network such as the Internet corresponding to the ledgers may thereby attempt to encode information within these ledgers. In some examples, the data integrity and authentication assurances provided by the disclosed subject matter corresponding to method 300 may be improved by ledgers that are public, thereby enabling a larger number of individuals to obtain and verify these assurances.

Moreover, in some examples, such ledgers may be encrypted, as further outlined in step 304 of method 300. In even more specific examples, the ledgers may be encrypted such that encoding the received digital media content enables a user with access to the encrypted distributed ledger to verify that the digital media content was encoded within the encrypted distributed ledger without further exposing the digital media content to being extracted from the encrypted distributed ledger. In other words, in these illustrative examples, access to the various assurances provided by the encrypted ledger may be asymmetrical in the sense that a user accessing the encrypted ledger must possess a copy of the encoded content in order to verify that the content was previously encoded within the encrypted ledger. In contrast, a user with access to the encrypted ledger will not be able to extract content that is encrypted and encoded within the encrypted ledger. In this manner, an entity such as a news organization or a law enforcement organization would be able to first encrypt content within the encrypted distributed ledger, while nevertheless maintaining the privacy and confidentiality of the information that was encoded. Only subsequently, after such an organization released the encoded content to one or more additional entities, would these additional entities be able to use these copies of the encoded content to thereby consult the encrypted distributed ledger and verify that the content was previously encoded at the earlier time.

In some examples, the digital signature encoded by encoding module 106 may further include (e.g., in addition to one or more of the items listed at step 304) (i) a digital signature of geolocation information indicating a location where the capturing device captured the digital media content, (ii) a digital signature of a focal length of a camera that captured the digital media content, and/or (iii) a digital signature of an item of EXIF metadata matching the digital media content. Additionally, or alternatively, the digital signature may also optionally include a digital signature of any other suitable item of metadata describing one or more details of the capturing process whereby capturing device 280 captured digital media content 122. Moreover, in these examples and in all other additional examples described herein, the phrase "the digital signature may include a digital signature of an additional item of information" may generally refer to either (i) encoding multiple separate digital signatures (e.g., multiple instances of the process of digitally signing different items of information) together as a package within the encrypted distributed ledger and/or (ii) aggregating multiple underlying items of content together and then digitally signing them in a single instance of the digital signature encryption process. Either or both of these processes result effectively in the same results and benefits, and these two options are, therefore, generally interchangeable within the context of this application.

More generally, in some examples, a digital signature process performed at computing device 202 may correspond to digitally signing the received digital media content using a private key corresponding to an entity, such as an individual or organization, which performed the capturing of the content and/or the uploading or encoding of the content.

Furthermore, in some examples, a digital signature process performed by the cryptoprocessor at the capturing device may correspond to the cryptoprocessor using a private key assigned to the cryptoprocessor (e.g., assigned to the capturing device, a type of the capturing device, and/or a maker of the capturing device) to perform the digital signing. In any one or more of these examples of digital signature processing, the digital signature may correspond to (i) the digital signature process applied to the entire portion of digital media content, thereby resulting in a corresponding encrypted and digitally signed version of the digital media content and/or (ii) the digital signature process applied to a hash or other fingerprint of the digital media content, which may help to conserve storage space. Either option may result in essentially the same level of assurance associated with digital signature technology. Accordingly, when encoded within the encrypted distributed ledger, any illustrative example of a digital signature, as discussed further below, may refer to one or both of these items of information listed immediately above.

In addition to the above, the digital signature may also optionally be uploaded together with a corresponding public key that matches the private key used to perform the digital signing process, thereby enabling users to conveniently perform the verification process using the public key of the public-private key pair. Furthermore, in any of the digital signature examples of digitally signing listed above, the digital signature process may refer to: (i) digitally signing the digital media content itself, (ii) digitally signing the digital media content itself and also separately digitally signing metadata describing one or more aspects of the digital media content and/or the capturing of the digital media content, and (iii) digitally signing the digital media content after the digital media content has been slightly modified with a watermark, or other indication of metadata, such that the same digital signature of the modified digital media content thereby further provides a digital signature for both the underlying content and also the metadata describing this content. As a more specific version of this last embodiment, the watermark may include a digital signature of the original raw digital media content prior to insertion of the watermark, as performed through the cryptoprocessor described above.

Additionally, or alternatively, in further embodiments, the assurance of authenticity associated with digitally signing the digital media content may include at least one of: (i) an assurance that the digital media content originated from the capturing device, (ii) an assurance of a recorded time of recording the digital media content, and/or (iii) an assurance that the entity encoding the received digital media content operated the capturing device to record the digital media content. For example, digitally signing the digital media content may be performed through the cryptoprocessor embedded within the capturing device, thereby providing by design a type of assurance that captured media content exiting the capturing device originates from the capturing device. In some examples, the capturing device may use its own asymmetric key pair that may be uniquely assigned to the capturing device. Additionally, or alternatively, in some examples the capturing device may use an asymmetric key pair that is associated with a specific type, model, and/or brand of the capturing device, which may further be embedded in other copies or instances of the same specific type, model, and/or brand. In some examples, digitally signing through the cryptoprocessor may also include digitally signing one or more items of metadata associated with capturing the digital media content. For example, digitally signing for the cryptoprocessor may include digitally signing an indication of timing metadata that further indicates a timing and/or date, etc., of when the capturing process took place.

In even further examples, the cryptoprocessor may include an asymmetric key pair associated with an entity (e.g., an individual or organization) that is performing the capturing process (e.g., clicking the camera to take the picture or video). Accordingly, the cryptoprocessor through the digital signature process may further apply the private key of this asymmetric key pair to provide an assurance that the capturing process was performed by an individual or organization with ownership over, possession over, and/or otherwise in association with the capturing device actually performing the capturing process. Alternatively, the same asymmetric key pair and corresponding certificate may be used to provide both assurances (e.g., an assurance that a specific capturing device, or capturing device type, performed the capturing, and also an assurance that this capturing device has the association with the entity operating the capturing device). For example, a public key of the asymmetric key pair may be registered with a certificate authority that thereby confirms both of these specific assurances listed above.

In a further specific example, the assurance of authenticity associated with the cryptoprocessor performing the digital signing of the digital media content may include an assurance that the digital media content originated from a sensor of the capturing device prior to the digital media content being accessible to any computing component of the capturing device with a capability to manipulate, or deceptively manipulate, the digital media content. For example, the capturing device may have a hardware, firmware, and/or software configuration, including one or more trusted and/or cryptographic information pathways, thereby providing by design an assurance that the digital signature processing is performed immediately, or almost immediately, after the sensor captures the raw data associated with the digital media content. In these further examples, the digital signature processing may also be performed, through a design guarantee, prior to any general purpose computing component, video modification component, and/or other computing component, which has the capacity to manipulate the raw captured content (e.g., deceptively manipulate), thereby assuring that the output digital media content, as digitally signed, has integrity and authenticity. In other words, any subsequent modification of the digital media content, either by a digital processing component at the capturing device or computing device 202, for example, would thereby break the digital signature, and thereby further undermine the assurance of integrity and authenticity. In these examples, the specific design guarantees that are outlined above provide that the assurance of integrity and authenticity is associated with the image as it leaves the sensor of the capturing device, rather than associated with the image as it leaves the entirety of the capturing device, thereby addressing the fact that many capturing devices include computing components that are able to manipulate digital media content after capturing of the corresponding raw data.

In even further examples, encoding module 106 may encode an identifier of the received digital media content into the encrypted distributed ledger such that encoding module 106 encodes an indication of a time of the encoding and such that a user with access to the encrypted distributed ledger can subsequently verify the time of the encoding. In other words, in these examples, encoding module 106 encodes the time of encoding, as distinct from encoding the time of capturing the content, as alluded to above. Moreover, in some embodiments the time of encoding the digital media content will generally occur after the time of capturing the digital media content (e.g., as long as both of these indications of timings are accurate), thereby enabling the user to later compare the digitally signed timing of the capturing of the content with the timing of encoding the content, and further enabling the user to verify that the encoding occurred after the timing of capturing.

Figure 4:
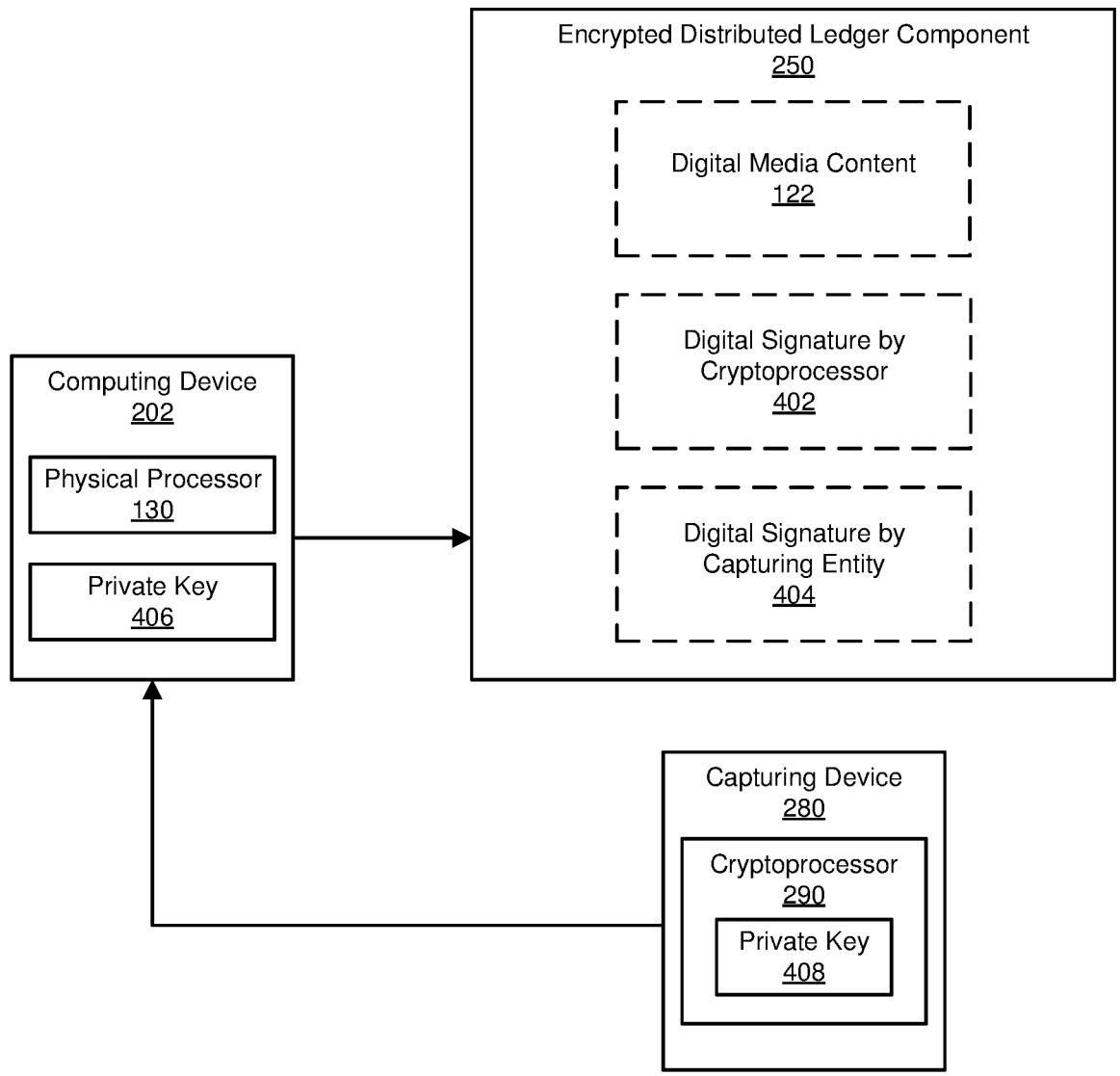
FIG. 4 is a block diagram of an example workflow corresponding to the method for authenticating digital media content.

FIG. 4 provides an example illustration of a workflow corresponding to the embodiment of method 300, as further discussed above. As further illustrated in this figure, FIG. 4 generally provides a more detailed and expanded version of portions of system 200 shown in FIG. 2. In particular, in this embodiment three separate items of information may be encoded within encrypted distributed ledger component 250: digital media content 122 and/or one or more of the following digital signatures: (i) a digital signature by cryptoprocessor 402 corresponding to the digital signature of digital media content 122 using the cryptoprocessor of the capturing device and an associated private key 408 and/or (ii) a digital signature by capturing entity 404 corresponding to the digital signature of digital media content 122 using a private key 406 that is assigned to this entity (e.g., and optionally corresponding to a public key and identity published by a corresponding certificate authority or otherwise verified for authenticity as part of a certified public-private key pair). For example, an individual, photographer, media entity, media organization, news organization, law enforcement organization, and/or any other suitable private or government organization may use a private key, such as private key 406, to further digitally sign the digital media content. In some examples, digitally signing the digital media content may include digitally signing using private key 406 being applied to digital signature by cryptoprocessor 402, since digital signature by cryptoprocessor 402 may, in some scenarios, simply correspond to a modified or encrypted form of the underlying digital media content.

For parallel reasons, in some embodiments, digital media content 122 itself (e.g., in an unencrypted form) may be omitted from the encoding process at encrypted distributed ledger component 250, since the original and unmodified digital media content may be extracted, in some scenarios, such as where either one of the digital signatures shown in FIG. 4 corresponds to a digital signature of the entire underlying digital media content (as distinct from a hash or fingerprint thereof), such that the underlying digital media content may be extracted, in unmodified format, simply using one or more public keys corresponding to these digital signatures. Nevertheless, in some scenarios this may be a less commonplace embodiment, simply because it may be more helpful to conserve storage space by using digital signatures based on hashes for fingerprints, in which case underlying digital content cannot necessarily be extracted from these digital signatures.

The above discussion provides a general overview of method 300 shown in FIG. 3. Additionally, or alternatively, the following discussion provides an overview of concrete and potentially more detailed embodiments of the disclosed subject matter.

The disclosed subject matter may involve using a distributed public-private ledger ("DPPL"), combined with an on-device cryptoprocessor, such as a TRUSTED PLATFORM MODULE, to prove chain of custody for digital media. The disclosed subject matter will optionally allow proving integrity of the media, as well as the (approximate) time at which the media was recorded. Finally, the disclosed subject matter will also optionally enable organizations, such as news organizations, to prove provenance of digital recordings which they cannot yet publish in cleartext and/or publicly.

Without loss of generality, the following discussion will use "photo" and "camera" to describe digital media and the corresponding recording device and related metadata that is already included such as geolocation information, focal length, and other EXIF data in the image. This can equally apply to video or sound recordings, etc., and any media-capturing device used to capture such media. Additionally, the following discussion may use the example of "news organizations," yet nevertheless the disclosed subject matter may be used by any individual or organization interested in digital chain of custody (for example, law enforcement).

According to the disclosed subject matter, in some embodiments, a corresponding attestation system may include the following three steps. First, the disclosed subject matter may include device-level attestation. For example, the camera may digitally sign one or more (e.g., be configured to digitally sign all) photos captured by the camera as "true originals" using a built-in cryptoprocessor. This may include phone metadata, and in some scenarios the metadata may be generated in an inviolable way. In some scenarios, the disclosed subject matter may also involve an enclave embedded adjacent to the camera, and/or the possibility of creating a trusted channel between the cryptoprocessor and the camera enclave.

In some specific examples, the techniques outlined above may be resilient against the user editing the photo on the device. For example, the original raw data corresponding to the original photo may be digitally signed at the time of capture rather than at the time of extraction.

Secondly, the disclosed subject matter may include organization-level attestation. The photo may be extracted to a computer, and it may optionally be extracted together with the camera's digital signature, as outlined above. The news organization may optionally use its private key to also digitally sign the extracted photo, thereby providing an assurance of ownership.

Thirdly, the disclosed subject matter may include an optional system of trusted typesetting. For example, the news organization may upload the photo, as part of a tuple of items of information (e.g., the photo itself, the digital signature from the cryptoprocessor, and the digital signature from the individual or organization operating the camera or uploading the photo). Additionally, or alternatively, the news organization may upload any suitable permutation of one or two of these three items of information, as further discussed above. More specifically, the corresponding entity may upload and/or encode one or more of these items of information within a ledger, such as an encrypted distributed ledger and/or a globally shared and encrypted ledger. In some examples, the photo itself may be invisible, yet proof of its provenance and ownership may be persistent within the ledger, as further discussed above. The time of encoding the photo may be proven through the distributed nature of the ledger.

In view of the above, the news organization or other suitable organization may be able to make the following assurances. First, the news organization can ensure that the photo is an original, as taken by the camera, and it has not been altered (i.e., step 1). Secondly, the news organization can assure that the news organization actually took the photo (i.e., step 2). Thirdly, the news organization can assure that the photo was taken before the time purported (i.e., step 3).

Moreover, the above discussion suggests how the disclosed subject matter may optionally resolve disputes regarding the integrity and authenticity of digital media content. To resolve these disputes, the news organization may optionally provide the original photo, a block-specific key, and/or a pointer to the relevant block in the ledger. Any inquiring party can find the chain of custody from step 1 in the block, together with the time that the photo was entered into the ledger.

The disclosed subject matter may also optionally help to facilitate other applications. For example the technology outlined above may be helpful to law enforcement, by allowing investigators to prove chain of custody for videos, audio recordings, and photographs at trials, etc. The optionally private nature of the ledger would enable law enforcement to safeguard the materials in their investigation until trial/discovery, for example.

The following discussion provides some answers to some expected questions regarding the disclosed subject matter. "Can steps 1 and 2 be combined?" Yes, in some scenarios the organization can embed its own credentials and/or private-public key pair into the cryptoprocessor.

"Why is step 2 necessary?" Step 1 may, in some scenarios, only guarantee that the photo is an original, but does not speak to which organization took the photo.

"What about including location data?" In some scenarios, location and/or geolocation information may be included, as further discussed above, and yet there may remain some questions about how to verify the integrity of such location information.

"Why may step 3 be involved?" At some scenarios, step 3 may optionally be involved, because trusted timestamping may not necessarily be available at a single device level.

"Can step 3 be avoided if the news organization publishes the photo right away?" In some scenarios, yes, step 3 may be avoided. Nevertheless, there are many scenarios where an organization is working on a story or investigation and cannot yet publish original digital media content, as further described above. Moreover, in some scenarios some clips are not evidently important in the moment and yet they may become important after further revelations due to news or law enforcement investigations, etc.

"What stops an attacker from quickly generating a convincing fake, then re-recording that fake and uploading it using this invention?" In some scenarios, nothing may prevent this from occurring. Nevertheless, the disclosed subject matter may provide a technique for detecting videos and/or other content that were doctored after recording by third-party organizations. Despite these improved benefits, users may still in some cases rely on existing real-world trust relationships to bootstrap the trust in the media. Moreover, step 2 may provide a proof of authenticity. Additionally, the metadata described above can be used to help identify inconsistencies with the photo.

"What about hardware-level attacks?" The disclosed subject matter may help to limit the scope of such attacks. If there are other attacks that are not necessarily addressed by the design techniques outlined above, then this may suggest an avenue for additional research.

Figure 5:
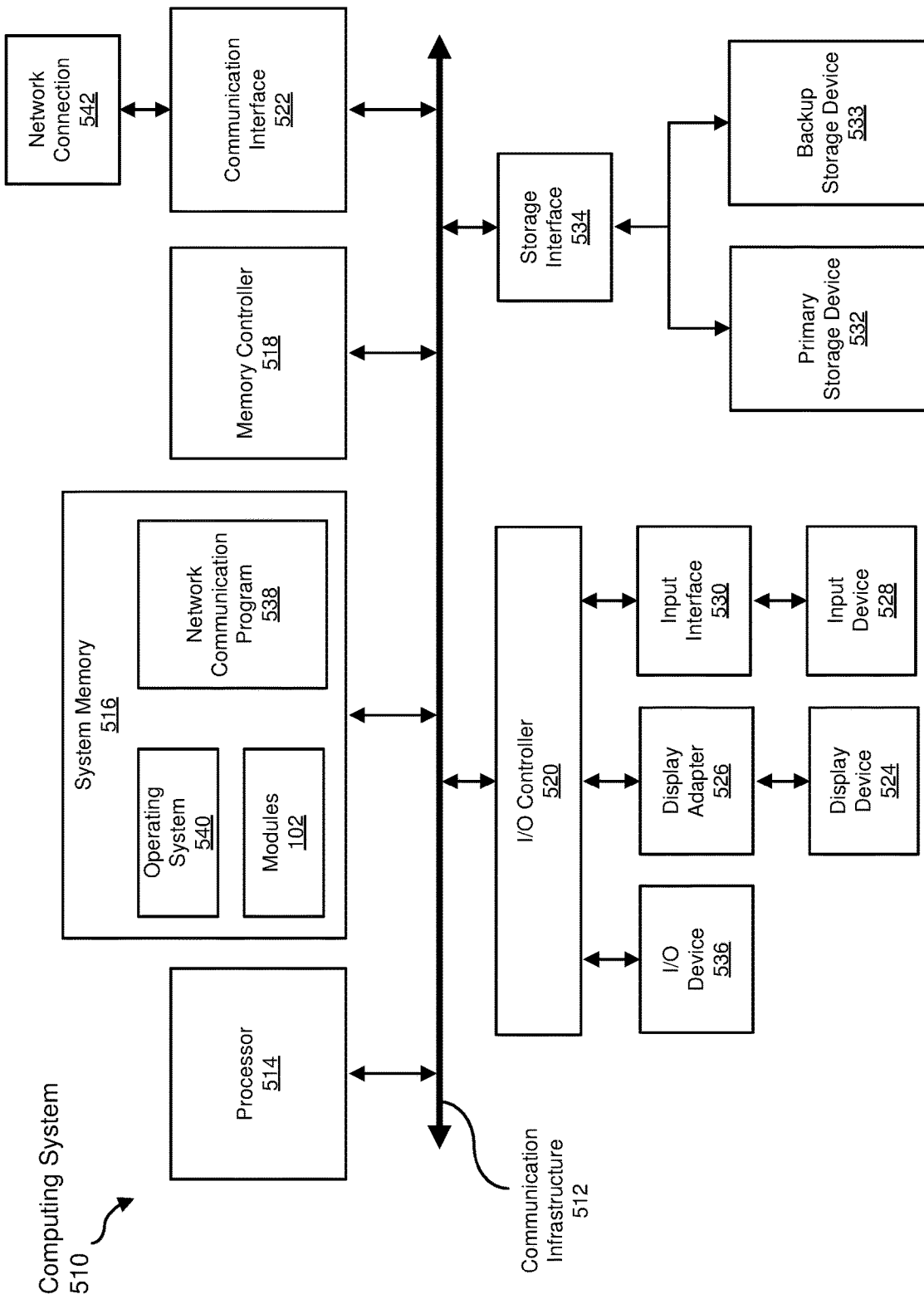
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
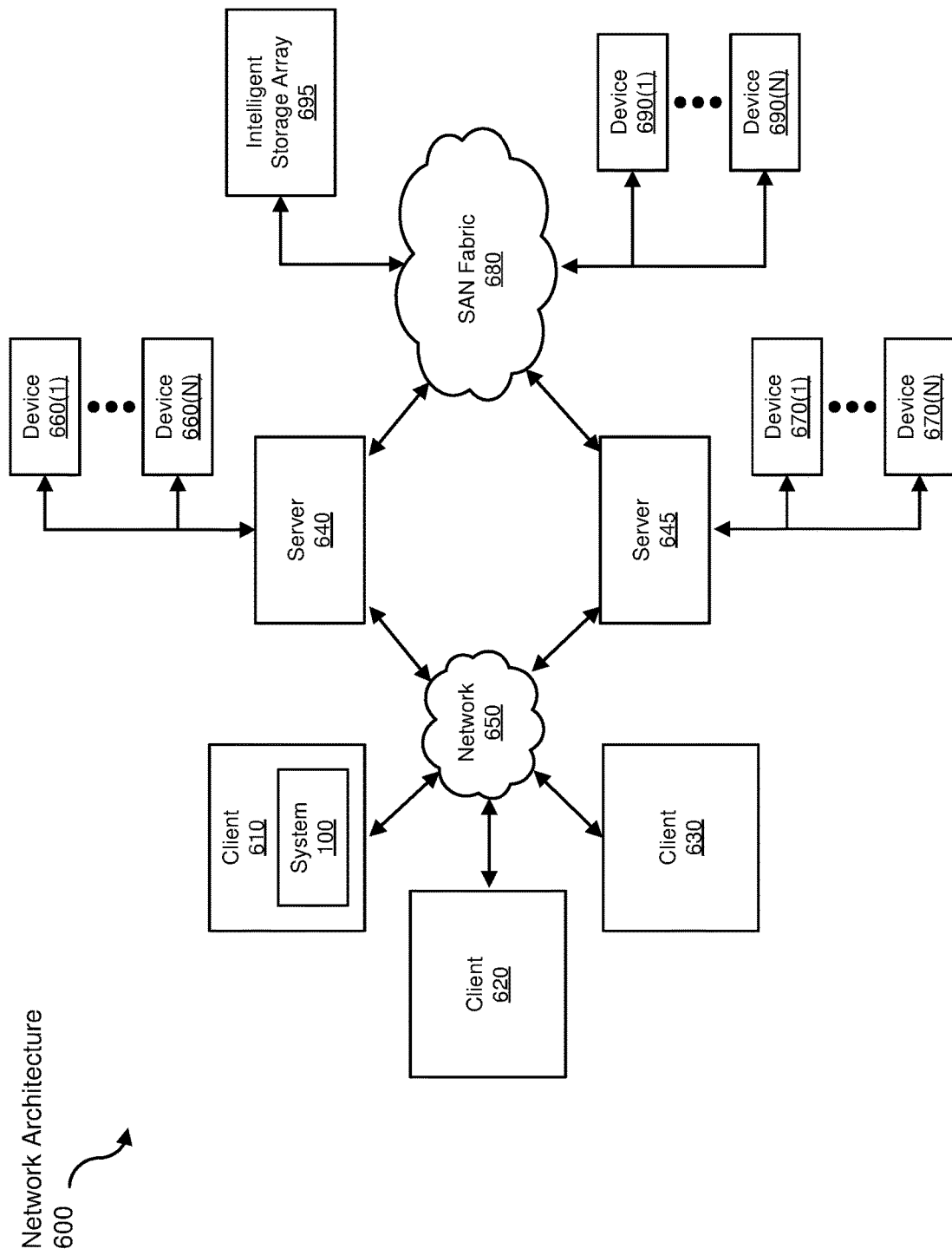
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the present disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for authenticating digital media content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for authenticating digital media content, at least a portion of the method being performed by a computing device comprising at least one processor, the method comprising:
receiving digital media content that has been captured by a capturing device and digitally signed through a cryptoprocessor embedded within the capturing device to provide an assurance of authenticity regarding how the capturing device captured the digital media content; and
encoding, to an encrypted distributed ledger, an identifier of the received digital media content, a first digital signature of the digital media content by the capturing device, and a second digital signature of the digital media content by an entity encoding the received digital media content such that the encoding becomes available for subsequent verification through the encrypted distributed ledger;
wherein:
the cryptoprocessor digitally signs the digital media content using a private key assigned to the cryptoprocessor; and
the entity uploads a tuple of items of information that includes the identifier of the digital media content, the first digital signature, and the second digital signature.

2. The computer-implemented method of claim 1, wherein the encrypted distributed ledger comprises a distributed public-private ledger.

3. The computer-implemented method of claim 1, wherein the first digital signature further comprises a digital signature of a focal length of a camera that captured the digital media content.

4. The computer-implemented method of claim 1, wherein the first digital signature further comprises a digital signature of an item of EXIF metadata matching the digital media content.

5. The computer-implemented method of claim 1, wherein the cryptoprocessor comprises an on-device TRUSTED PLATFORM MODULE.

6. The computer-implemented method of claim 1, further comprising generating, in an inviolable manner, metadata describing the digital media content.

7. The computer-implemented method of claim 1, wherein the first digital signature is generated in part using a trusted channel between the cryptoprocessor and a camera enclave.

8. The computer-implemented method of claim 1, wherein the method is resilient against user editing of the digital media content on the capturing device due to original raw data corresponding to the digital media content being digitally signed at a time of capture rather than at a time of extraction.

9. The computer-implemented method of claim 1, wherein the entity comprises an organization that uses a private key assigned to the organization to create the second digital signature of the digital media content such that the organization provides an assurance of ownership.

10. The computer-implemented method of claim 1, wherein the digital media content is invisible yet proof of provenance of the digital media content is persistent within the encrypted distributed ledger.

11. A system for authenticating digital media content, the system comprising:
a reception module, stored in memory, that receives digital media content that has been captured by a capturing device and digitally signed through a cryptoprocessor embedded within the capturing device to provide an assurance of authenticity regarding how the capturing device captured the digital media content;
an encoding module, stored in memory, that encodes, to an encrypted distributed ledger, an identifier of the received digital media content, a first digital signature of the digital media content by the capturing device, and a second digital signature of the digital media content by an entity encoding the received digital media content such that the encoding becomes available for subsequent verification through the encrypted distributed ledger; and
at least one physical processor configured to execute the reception module and the encoding module;
wherein:
the cryptoprocessor is configured to digitally sign the digital media content using a private key assigned to the cryptoprocessor; and
the entity uploads a tuple of items of information that includes the identifier of the digital media content, the first digital signature, and the second digital signature.

12. The system of claim 11, wherein the digital media content comprises at least one of:
audio content recorded by a microphone;
visual content recorded by a camera sensor; or
video content recorded by a video camera sensor.

13. The system of claim 11, wherein the first digital signature further comprises at least one of:
a digital signature of geolocation information indicating a location where the capturing device captured the digital media content;
a digital signature of a focal length of a camera that captured the digital media content; or
a digital signature of an item of EXIF metadata matching the digital media content.

14. The system of claim 11, wherein the assurance of authenticity comprises at least one of:
an assurance that the digital media content originated from the capturing device;
an assurance of a recorded time of recording the digital media content; or
an assurance that the entity encoding the received digital media content operated the capturing device to record the digital media content.

15. The system of claim 11, wherein the assurance of authenticity comprises an assurance that the digital media content originated from a sensor of the capturing device prior to the digital media content being accessible to any computing component of the capturing device with a capability to manipulate the digital media content.

16. The system of claim 11, wherein the encoding module encodes the received digital media content such that the encoding enables a user with access to the encrypted distributed ledger to verify that the digital media content was encoded within the encrypted distributed ledger without further exposing the digital media content to being extracted from the encrypted distributed ledger.

17. The system of claim 11, wherein the entity encoding the received digital media content into the encrypted distributed ledger comprises at least one of:
a news organization; or
a law enforcement organization.

18. The system of claim 11, wherein the encoding module encodes the received digital media content into the encrypted distributed ledger by encoding an indication of a time of the encoding such that a user with access to the encrypted distributed ledger can subsequently verify the time of the encoding.

19. The system of claim 18, wherein the encoding module encodes the indication of the time of the encoding such that the encoding enables the user to subsequently verify that the time of the encoding occurred after a time of the capturing device capturing the received digital media content as indicated by a digital signature through the cryptoprocessor of the time of the capturing device capturing the received digital media content.

20. A non-transitory computer-readable medium comprising one or more computer-readable instructions that, when executed by at least one processor of a computing device, cause the computing device to:

receive digital media content that has been captured by a capturing device and digitally signed through a cryptoprocessor embedded within the capturing device to provide an assurance of authenticity regarding how the capturing device captured the digital media content; and encode, to an encrypted distributed ledger, an identifier of the received digital media content, a first digital signature of the digital media content by the capturing device, and a second digital signature of the digital media content by an entity encoding the received digital media content such that the encoding becomes available for subsequent verification through the encrypted distributed ledger;

wherein:

the cryptoprocessor digitally signs the digital media content using a private key assigned to the cryptoprocessor; and the entity uploads a tuple of items of information that includes the identifier of the digital media content, the first digital signature, and the second digital signature.

* * * * *